US011348194B2

(12) United States Patent
Gibbon et al.

(10) Patent No.: US 11,348,194 B2
(45) Date of Patent: May 31, 2022

(54) SYSTEM AND METHOD FOR INTERFACING ENTITIES ENGAGED IN PROPERTY EXCHANGE ACTIVITIES

(71) Applicant: The Toronto-Dominion Bank, Toronto (CA)

(72) Inventors: Patrick Gibbon, Ancaster (CA); James Zachary Pryor, Toronto (CA); Jonathan K. Barnett, Oakville (CA); Roy D'souza, Oakville (CA); William Stewart James Law, St. Catherines (CA); Christopher Arthur Holland McAlpine, Grimsby (CA); Ethan Christopher McAlpine, Grimsby (CA); Maria Verna, Vaughan (CA); Patrick Robert Goralski, London (CA); Cathleen Ruth Carrel, Minesing (CA); Rohan Anand, Toronto (CA); Christy Ann Dyba, Markham (CA); Dheeraj Jagtiani, Toronto (CA); Ali Hafezi, Toronto (CA); Ashkan Alavi-Harati, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 283 days.

(21) Appl. No.: 16/275,087

(22) Filed: Feb. 13, 2019

(65) Prior Publication Data

US 2020/0258175 A1 Aug. 13, 2020

(51) Int. Cl.
*G06Q 30/06* (2012.01)
*G06Q 50/16* (2012.01)

(52) U.S. Cl.
CPC ....... *G06Q 50/167* (2013.01); *G06Q 30/0613* (2013.01)

(58) Field of Classification Search
CPC .................. G06Q 30/0605; G06Q 30/0631
See application file for complete search history.

(56) References Cited

U.S. PATENT DOCUMENTS

| 5,664,115 | A | 9/1997 | Fraser |
| 6,505,166 | B1 | 1/2003 | Stephanou |
| (Continued) | | | |

OTHER PUBLICATIONS

What is API: Definition, Specifications, Types, Documentation | AltexSoft (Year: 2021).*
What is an Application Programming Interface, IBM (Year: 2020).*

*Primary Examiner* — Ming Shui
(74) *Attorney, Agent, or Firm* — CPST Intellectual Property Inc.; Brett J. Slaney

(57) ABSTRACT

A method and system are provided for interfacing entities engaged in property exchange activities. The method includes receiving a first signal including a request to engage in a property exchange activity by an acquiring entity, accessing first profile data for the acquiring entity, accessing second profile data for each of a plurality of advisor entities related to the property exchange activity, using the first profile data and the second profile data to generate at least one proposed match between a corresponding one or more of the plurality of advisor entities and the acquiring entity, sending a second signal including a recommendation, enabling the acquiring entity to respond to the recommendation and engage with advisor entities, providing a first advisor connection between the acquiring entity and the first advisor entity, and enabling at least one interaction in at least one advisor activity between the acquiring entity and the first advisor entity.

20 Claims, 10 Drawing Sheets

(56) References Cited

U.S. PATENT DOCUMENTS

| | | | |
|---|---|---|---|
| 7,653,594 B2* | 1/2010 | Davis | G06Q 30/0229 |
| | | | 705/39 |
| 7,752,054 B1 | 7/2010 | Anthony-Hoppe et al. | |
| 8,140,443 B2 | 3/2012 | Fawaz | |
| 8,204,782 B1 | 6/2012 | Forward | |
| 8,335,747 B1 | 12/2012 | Roberts | |
| 9,129,290 B2* | 9/2015 | Kannan | G06N 7/005 |
| 9,460,237 B2* | 10/2016 | Nguyen | G06Q 10/1095 |
| 2002/0038233 A1 | 3/2002 | Shubov et al. | |
| 2004/0088172 A1 | 5/2004 | Baglioni | |
| 2006/0047551 A1 | 3/2006 | Cotten et al. | |
| 2006/0112086 A1 | 5/2006 | Douress et al. | |
| 2007/0198384 A1 | 8/2007 | Prouty | |
| 2007/0203769 A1 | 8/2007 | Thomas | |
| 2008/0201247 A1 | 8/2008 | Bradford | |
| 2008/0300991 A1 | 12/2008 | Openiano | |
| 2009/0025063 A1* | 1/2009 | Thomas | G06F 21/6218 |
| | | | 726/4 |
| 2010/0161379 A1* | 6/2010 | Bene | G06Q 30/02 |
| | | | 705/7.31 |
| 2011/0060737 A1 | 3/2011 | Cardella | |
| 2012/0131034 A1* | 5/2012 | Kenedy | G06F 16/2237 |
| | | | 707/767 |
| 2012/0173306 A1* | 7/2012 | Fawaz | G06Q 30/02 |
| | | | 705/7.38 |
| 2014/0172479 A1 | 6/2014 | Gallagher et al. | |
| 2014/0278795 A1* | 9/2014 | Satyamoorthy | G06Q 30/0201 |
| | | | 705/7.33 |
| 2015/0127488 A1 | 5/2015 | Cutler | |
| 2015/0235313 A1 | 8/2015 | Jiang | |
| 2015/0242919 A1* | 8/2015 | Wickam | G06Q 30/0631 |
| | | | 705/26.44 |
| 2016/0162970 A1 | 6/2016 | Ketron | |
| 2018/0253790 A1 | 9/2018 | Nokes et al. | |
| 2019/0080425 A1* | 3/2019 | Bui | G06F 16/9032 |

\* cited by examiner

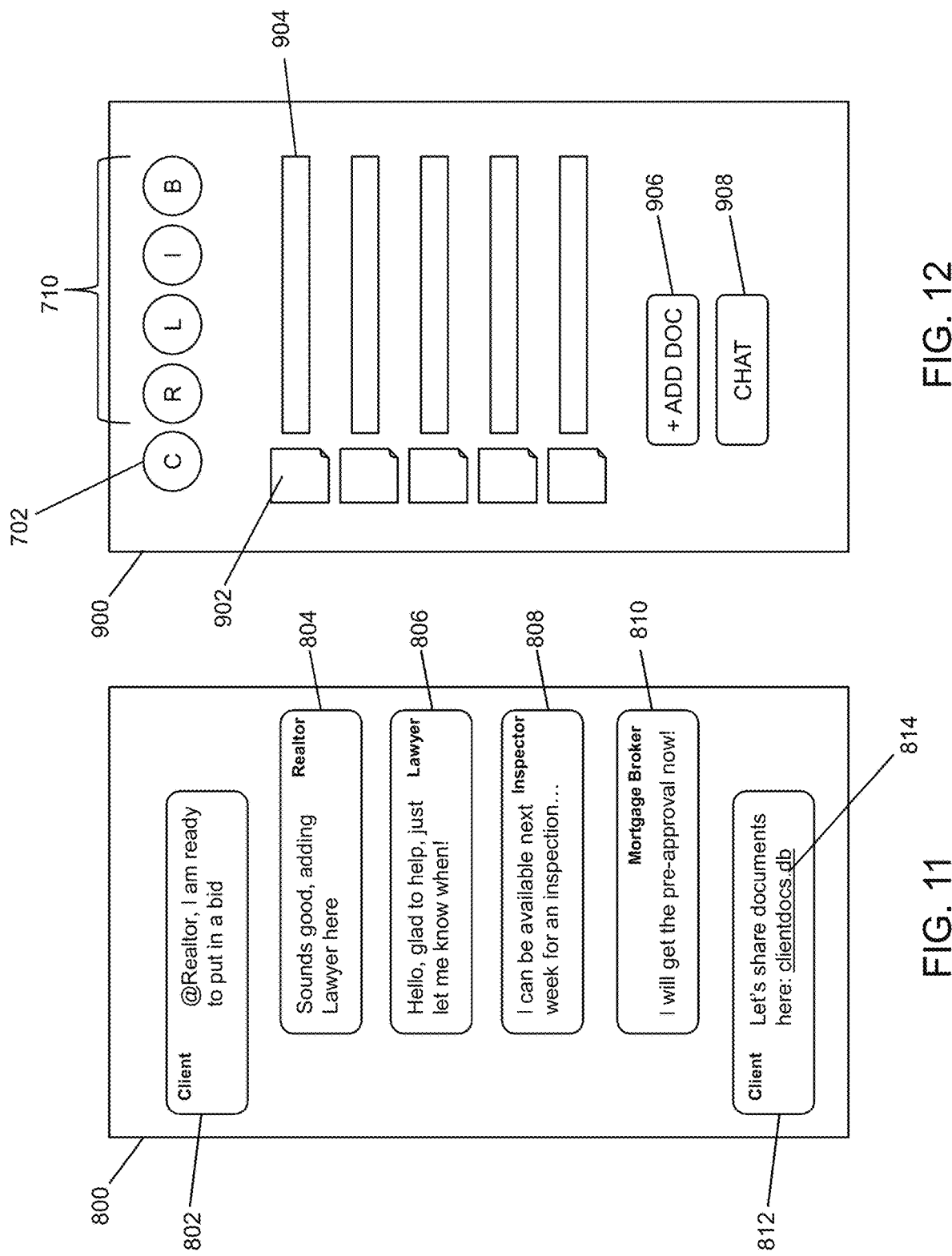

SYSTEM AND METHOD FOR INTERFACING ENTITIES ENGAGED IN PROPERTY EXCHANGE ACTIVITIES

TECHNICAL FIELD

The following relates generally to interfacing entities engaged in property exchange activities.

BACKGROUND

Property exchange activities involving large and high value items acquired in the exchange may include complex or lengthy processes and can involve several individuals that act as advisors to the acquiring entity. For example, purchasing a home is typically one of the largest financial transactions an individual makes. In addition to financial matters such as securing a mortgage, the experience may be overwhelming, particularly for first-time buyers, as there are many other parties (generally referred to herein as advisors or brokers) involved in the homebuying process. Such parties can include, for example, realtors, mortgage brokers, lawyers, inspectors, and contractors. It may not be uncommon for potential buyers to spend a significant amount of time connecting with whom they believe to be suitable advisors, with trust being a significant factor in who they choose to engage with in the home buying process. The amount of time or a lack of connections or confidence in finding the right advisors may even cause a home buyer to either defer or rush into the process.

BRIEF DESCRIPTION OF THE DRAWINGS

Embodiments will now be described with reference to the appended drawings wherein:

FIG. 11 is an example of a graphical user interface of a virtual chat session.

FIG. 12 is an example of a graphical user interface of a document sharing tool.

DETAILED DESCRIPTION

Figure 1:
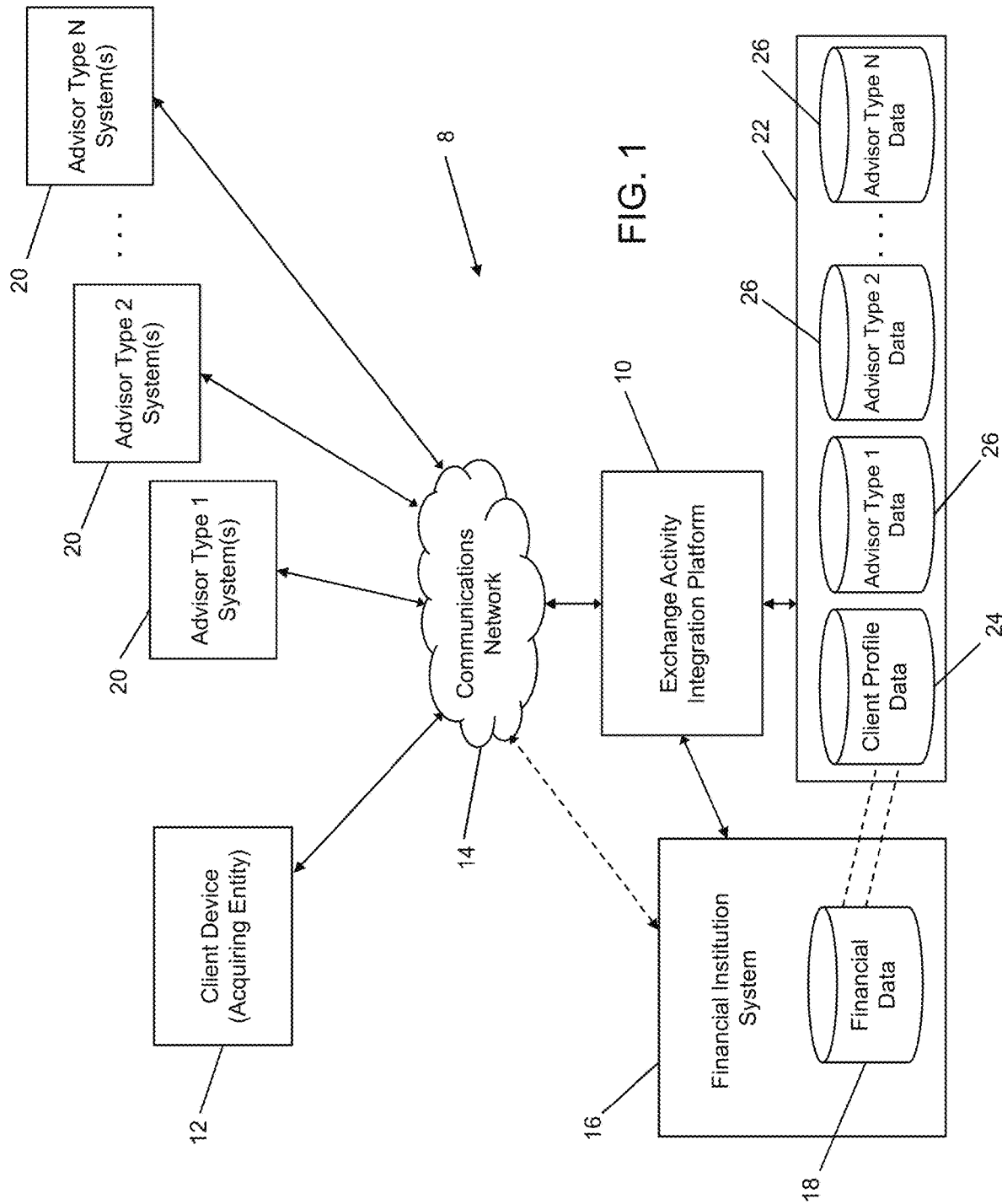
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Engaging in property exchange activities may require reliance on multiple advisors or other entities to complete multiple steps in the property exchange process. In large purchases such as homes and other properties, there may include a multi-stage process that requires interactions with advisors such as realtors, lawyers, mortgage brokers, and inspectors, to name a few, and may require coordination between these advisors. However, these advisors typically operate within their own domains, systems, or processes. Moreover, for many potential acquiring entities, the selection and engagement of these entities can be difficult and overwhelming. There exists a need to have a platform that can integrate the recommendation, selection, and communication between an acquiring entity and such advisor entities.

Users normally have a long-standing relationship with their financial institutions, e.g. banks, credit unions, investment firms, etc. As such, financial institutions can leverage the goodwill and trust to create a center of influence by integrating the other advisor entities to the financial institution channel thereby providing such a platform for their customers to address their non-financial as well as financial needs. For example, a home buying team may be created by matching the customer with the advisor entities using a recommendation engine as herein described.

Certain example systems and methods described herein are able to connect and interface an acquiring entity with advisors associated with property exchange activities, such as a home purchase. In one aspect, there is provided a device for interfacing entities engaged in property exchange activities. The device includes a processor, a communications module coupled to the processor, and a memory coupled to the processor. The memory stores computer executable instructions that when executed by the processor cause the processor to receive via the communications module a first signal including a request to engage in a property exchange activity by an acquiring entity, and access first profile data for the acquiring entity. The device has permission to access the first profile data. The memory also stores computer executable instructions that when executed by the processor cause the processor to access second profile data for each of a plurality of advisor entities related to the property exchange activity, use the first profile data and the second profile data to generate at least one proposed match between a corresponding one or more of the plurality of advisor entities and the acquiring entity, and send via the communications module to the acquiring entity a second signal including a recommendation. The recommendation includes the at least one proposed match. The memory also stores computer executable instructions that when executed by the processor cause the processor to provide an acquiring entity user interface via the communications module to enable the acquiring entity to respond to the recommendation and engage with advisor entities selected for the property exchange activity and, after receiving a first request to engage a first advisor entity of the plurality of advisor entities, provide a first advisor connection between the acquiring entity and the first advisor entity. The device enforces at least one access control criterion on the first advisor connection according to data of the first profile data required for activities performed by the first advisor entity. The memory also stores computer executable instructions that when executed by the processor cause the processor to enable via the communications module at least one interaction in at least one advisor activity between the acquiring entity and the first advisor entity.

In another aspect, there is provided a method of interfacing entities engaged in property exchange activities. The method is executed by a processor of a device and includes receiving via a communications module a first signal including a request to engage in a property exchange activity by an acquiring entity and accessing first profile data for the acquiring entity. There is permission to access the first profile data. The method also includes accessing second profile data for each of a plurality of advisor entities related to the property exchange activity, using the first profile data and the second profile data to generate at least one proposed match between a corresponding one or more of the plurality of advisor entities and the acquiring entity, and sending via the communications module to the acquiring entity a second signal including a recommendation. The recommendation includes the at least one proposed match. The method also includes providing an acquiring entity user interface via the communications module to enable the acquiring entity to respond to the recommendation and engage with advisor entities selected for the property exchange activity and, after receiving a first request to engage a first advisor entity of the plurality of advisor entities, providing a first advisor connection between the acquiring entity and the first advisor entity. At least one access control criterion is enforced on the first advisor connection according to data of the first profile data required for activities performed by the first advisor entity. The method also includes enabling via the communications module at least one interaction in at least one advisor activity between the acquiring entity and the first advisor entity.

In another aspect, there is provided non-transitory computer readable medium for interfacing entities engaged in property exchange activities. The computer readable medium includes computer executable instructions for receiving at a device via a communications module a first signal including a request to engage in a property exchange activity by an acquiring entity and accessing first profile data for the acquiring entity. There is permission to access the first profile data. The computer readable medium also includes computer executable instructions for accessing second profile data for each of a plurality of advisor entities related to the property exchange activity, using the first profile data and the second profile data to generate at least one proposed match between a corresponding one or more of the plurality of advisor entities and the acquiring entity, and sending via the communications module to the acquiring entity a second signal including a recommendation. The recommendation includes the at least one proposed match. The computer readable medium also includes computer executable instructions for providing an acquiring entity user interface via the communications module to enable the acquiring entity to respond to the recommendation and engage with advisor entities selected for the property exchange activity and, after receiving a first request to engage a first advisor entity of the plurality of advisor entities, providing a first advisor connection between the acquiring entity and the first advisor entity. At least one access control criterion is enforced on the first advisor connection according to data of the first profile data required for activities performed by the first advisor entity. The computer readable medium also includes computer executable instructions for enabling via the communications module at least one interaction in at least one advisor activity between the acquiring entity and the first advisor entity.

In certain example embodiments, after receiving at least one second request to engage at least one corresponding second advisor entity of the plurality of advisor entities, at least one second advisor connection may be provided between the acquiring entity and the at least one second advisor entity. In certain example embodiments, the device enforcing at least one access control criterion on the at least one second advisor connection may be done according to data of the first profile data required for activities performed by the corresponding second advisor entity. In certain example embodiments, at least one interaction in at least one advisor activity may be enabled between the acquiring entity and the at least one second advisor entity, via the communications module.

In certain example embodiments, a third signal including a proposal for the first advisor entity based on a highest match may be sent via the communications module, and a fourth signal may be awaited and received via the communications module including the first request to engage the first advisor entity before determining others of the plurality of advisor entities. In certain example embodiments, the first profile data and the second profile data may be used to generate at least one secondary proposed match between the corresponding at least one second advisor entity and the acquiring entity, based at least in part on affinity between the first advisor entity and the at least one second advisor entity, and a fifth signal including at least one secondary recommendation for the at least one second advisor entity may be sent via the communications module.

In certain example embodiments, subsequent to commencement of the exchange activity, the first profile data and the second profile data may be used to generate at least one proposed additional match between corresponding advisor entities and the acquiring entity, and a sixth signal including an additional recommendation to the acquiring entity may be sent via the communications module. In certain example embodiments, the additional recommendation includes the at least one proposed additional match.

In certain example embodiments, a document sharing tool may be provided to the acquiring entity and the first advisor entity via the communications module. In certain example embodiments, a communication tool may be provided to the acquiring entity and the first advisor entity via the communications module.

In certain example embodiments, the at least one proposed match between the corresponding advisor entity and the acquiring entity may be regenerated and a seventh signal including a revised recommendation sent via the communications module prior to receiving the first request, based on at least one change to the second profile data.

In certain example embodiments, at least one potential advisor entity may be contacted based on the at least one proposed match to obtain an acceptance to be included in the recommendation to the acquiring entity, and the recommendation generated based on receipt of the acceptance.

In certain example embodiments, the recommendation may include at least one option between a plurality of advisor entities of a same type. In certain example embodiments, the acquiring entity may be enabled to provide a selected option, and a selected advisor entity related to the selected option may be notified.

In certain example embodiments, the request to engage in the exchange activity may be detected by at least one of the communications module and the processor. In certain example embodiments, the communications module may detect an intention to engage in the exchange activity using an existing interaction channel between the acquiring entity and a financial institution.

In certain example embodiments, an eighth signal including a notification from the acquiring entity or a financial institution associated with the acquiring entity may be received via the communications module. The notification may include the intention to engage in the exchange activity.

In certain example embodiments, the exchange activity may correspond to a home purchase. In certain example embodiments, the plurality of advisor entities may include at least one of a real estate agent or broker, a legal advisor, a mortgage advisor, a home inspector, an insurer, a moving company, and a storage company.

In certain example embodiments, the first profile data for the acquiring entity may not yet be available to the device, and the device may obtain the permission to access the first profile data, or receive a ninth signal including the first profile data from the acquiring entity, via the communications module.

FIG. 1 illustrates an exemplary computing environment 8. In one aspect, the computing environment 8 may include an exchange activity integration platform 10 (referred to as "the platform 10" hereinafter), one or more client devices 12, and a communications network 14 connecting one or more components of the computing environment 8. The computing environment 8 may also include one or more advisor systems 20. In the example shown in FIG. 1, N types of advisor systems 20 are shown, and each type of advisor system 20 may include multiple individual advisor systems 20. For example, Advisor Type 1 may be associated with a realtor, and multiple realtors (each having their own system 20) may be capable of being connected in the computing environment 8 via the communications network 14. Similarly, Advisor Type 2 may be associated with a lawyer, and multiple lawyers (each having their own system 20) may be capable of being connected in the computing environment 8 via the communications network 14. Each Advisor Type in this example has or has access to an advisor system 20 in order to interface with the platform 10. It will be appreciated that the advisor system 20 may include a device, enterprise server, other computing device, or a collection thereof.

The computing environment 8 may also include a financial institution system 16 (e.g., commercial bank) that provides financial services accounts to users and processes financial transactions associated with those financial service accounts. While several details of the financial institution system 16 have been omitted for clarity of illustration, shown in FIG. 1 is a datastore (also referred to as a database, memory or memory element) that stores financial data 18. The financial data 18 may be associated with users of the client devices 12. The financial data 18 may include any data related to or derived from financial values or metrics associated with customers of the financial institution 16, for example, account balances, transaction histories, line of credit available, credit scores, mortgage balances, affordability metrics, investment account balances, investment values and types, among many others. The financial data 18 may also be associated with users of the advisor systems 20.

The computing environment 8 may also include a datastore 22. In the example shown in FIG. 1, the datastore 22 may be used to store client profile data 24 and advisor type data 26. The client profile data 24 may be used to store data accumulated by or provided to the platform 10 and which is associated with a user of a client device 12. The client profile data 24 may be mapped to corresponding financial data 18 for that user (as illustrated using dashed lines in FIG. 1) and/or may include some of the financial data 18. The client profile data 24 can include both data that is associated with a client as well as data that is associated with one or more user accounts for that client as recognized by the platform 10. The data associated with a client may include, without limitation, demographic data (e.g., age, gender, income, location, etc.), preference data input by the client (e.g., hobbies, likes, dislikes, etc.), and inferred data generated through machine learning, modeling, pattern matching, or other automated techniques. The client profile data 24 may also include historical interactions and transactions associated with the platform 10, e.g., login history, search history, communication logs, document sharing metrics, etc. The client profile data 24 may also include documents, media content or other files that are being shared on the platform 10 or otherwise stored for the client.

In this example, N types of advisor systems 20 are shown and each advisor system 20 has associated advisor type data 26. In the above example, the advisor type data 26 for Advisor Type 1 is associated with the one or more realtors. The advisor type data 26 for a particular advisor type may include various types of data, such as, without limitation, name, company, gender, ratings (if available), geographic area of operation, contacts relevant to the platform 10 (e.g., other advisors that utilize the platform 10), stated or inferred experiences in certain services or product types. For example, advisor type data 26 for a real estate firm may include a roster of agents, their personal details, geographical areas in which they represent clients, whether their experience lies in condominium developments versus single family dwellings, rankings from websites or industry organizations, customized data entered by the platform 10 (e.g., personality traits, past success matches with clients, etc.), among other types of data. The advisor type data 26 may be updated and refined over time using external sources such as rankings or ratings services, or internal sources such as successful or unsuccessful matches(s) enabled via the platform 10.

It can be appreciated that the datastore 22 is shown separately from the platform 10 for illustrative purposes only and may also be at least partially stored within a database, memory, or portion thereof within the platform 10. It can also be appreciated that while the platform 10 and financial institution system 16 are shown as separate entities in FIG. 1, they may also be part of the same system. For example, the platform 10 can be hosted and provided within the financial institution system 16.

Client devices 12 may be associated with one or more users. Users may be referred to herein as acquiring entities, homebuyers, or other entities associated with exchange activities that are interfaced with one or more advisors and advisor systems 20. The computing environment 8 may include multiple client devices 12, each client device 12 being associated with a separate user or with one or more users. In certain embodiments, a user may operate client device 12 such that client device 12 performs one or more processes consistent with the disclosed embodiments. For example, the user may use client device 12 to engage and interface with recommended advisors to assist in an exchange activity, such as purchasing a home. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12 and different types of advisor systems 20. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, platform 10 may be one or more computer systems configured to process and store information and execute software instructions to perform one or more processes consistent with the disclosed embodiments. In certain embodiments, although not required, platform 10 may be associated with one or more business entities. In certain embodiments, platform 10 may represent or be part of any type of business entity. For example, platform 10 may be a system associated with a commercial bank (e.g., financial institution system 16), a retailer, or some other type of business.

Referring back to FIG. 1, the platform 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the platform 10 and financial institution system 16. The cryptographic server may be used to protect the financial data 18, client profile data 24, and advisor type data 26 by way of encryption for data protection, digital signatures or message digests for data integrity, and by using digital certificates to authenticate the identity of the users and client devices 12 and advisor systems 20 with which the platform 10 communicates to inhibit data breaches by adversaries. It can be appreciated that various cryptographic mechanisms and protocols can be chosen and implemented to suit the constraints and requirements of the particular deployment of the platform 10 as is known in the art.

Figure 2:
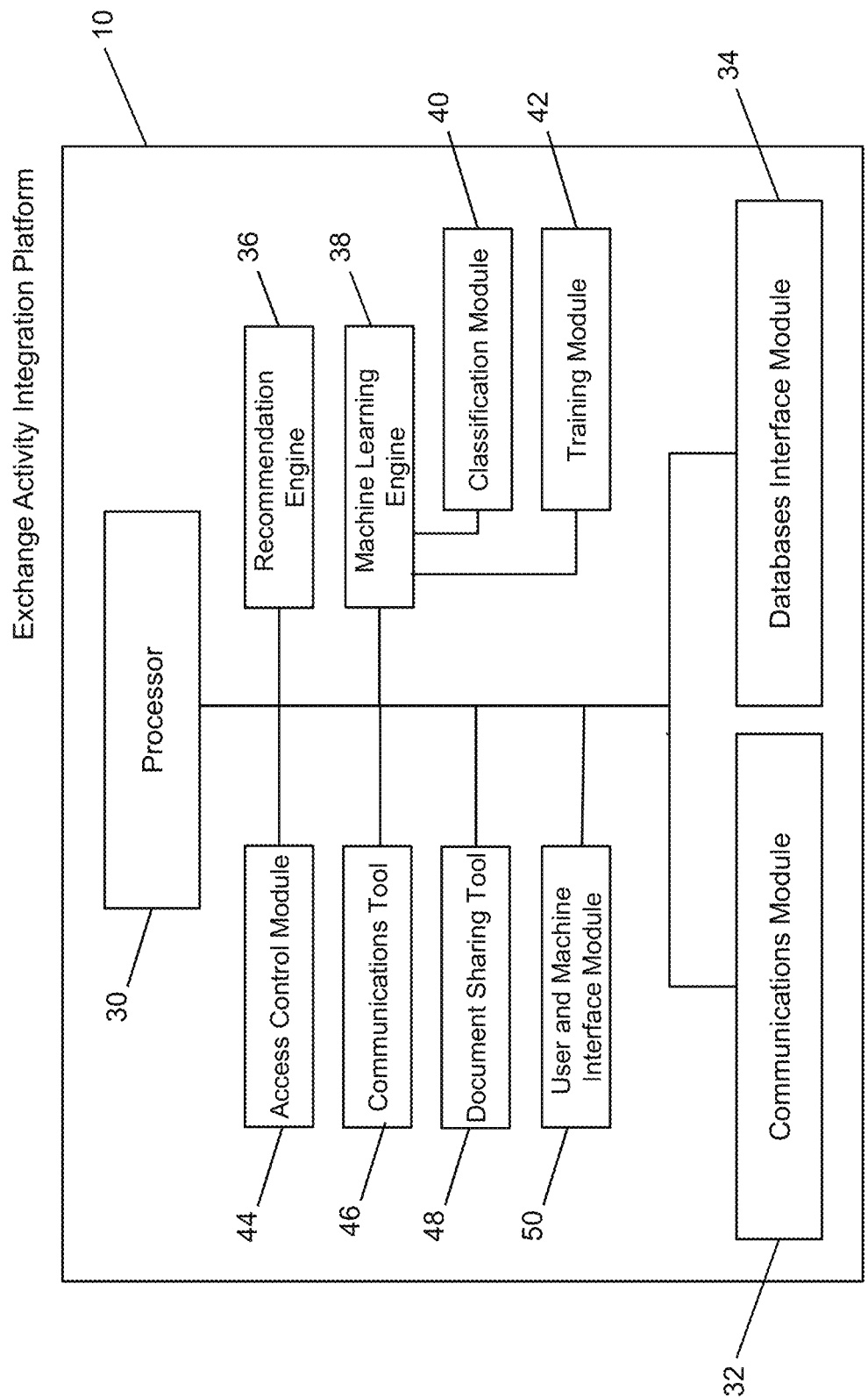
FIG. 2 is a block diagram of an example configuration of an exchange activity integration platform.

In FIG. 2, an example configuration of the platform 10 is shown. In certain embodiments, the platform 10 may include one or more processors 30, a communications module 32, and a database interface module 34 for interfacing with the datastore 22 to retrieve and store data. Communications module 32 enables the platform 10 to communicate with one or more other components of the computing environment 8, such as client device 12 or advisor systems 20 (or one of its components), via a bus or other communication network, such as the communication network 14. While not delineated in FIG. 2, the platform 10 includes at least one memory or memory device that can include a tangible and non-transitory computer-readable medium having stored therein computer programs, sets of instructions, code, or data to be executed by processor 30. FIG. 2 illustrates examples of modules, tools and engines stored in memory on the platform 10 and operated by the processor 30. It can be appreciated that any of the modules, tools, and engines shown in FIG. 2 may also be hosted externally and be available to the platform 10, e.g., via the communications module 32. In the example embodiment shown in FIG. 2, the platform 10 includes a recommendation engine 36, a machine learning engine 38, a classification module 40, a training module 42, an access control module 44, a communications tool 46, a document sharing tool 48, and a user and machine interface module 50.

The recommendation engine 36 is used by the platform 10 to generate one or more advisor recommendations for a client device 12. The recommendation engine 36 can access the client profile data 24, the financial data 18, and advisor type data 26 via the databases interface module 34 and apply one or more matching processes to generate the recommendation(s). The recommendation engine 36 may utilize or otherwise interface with the machine learning engine 38 to both classify data currently being analyzed to generate a recommendation, and to train classifiers using data that is continually being processed and accumulated by the platform 10.

The machine learning engine 38 may also perform operations that classify the client profile data 24 and advisor type data 26 in accordance with corresponding classifications parameters, e.g., based on an application of one or more machine learning algorithms to each of the groups of profile data 24, 26 (also referred to herein as "profile content"). The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying suitable matches between users and potential advisor entities. Subsequent to classifying the profile content, the recommendation engine 36 may further process each element of the profile content to identify, and extract, a value characterizing the corresponding one of the classification parameters, e.g., based on an application of one or more additional machine learning algorithms to each of the elements of the profile content. By way of the example, the additional machine learning algorithms may include, but are not limited to, an adaptive natural language processing algorithm that, among other things, predicts starting and ending indices of a candidate parameter value within each element of profile content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified profile content. Classification parameters may be stored and maintained using the classification module 40, and training data may be stored and maintained using the training module 42.

In some instances, classification data stored in the classification module 40 may identify one or more parameters, e.g., "classification" parameters, that facilitate a classification of corresponding elements or groups of recognized profile content based on any of the exemplary machine learning algorithms or processes described herein. The one or more classification parameters may correspond to parameters that can indicate an affinity or compatibility between users and potential advisors. For example, a target geographical area preference for a user's homebuying search can be correlated or deemed compatible or not with certain geographical areas targeted by a realtor or in which that realtor has received positive reviews, completed several transactions, etc.

In some instances, the additional, or alternate, machine learning algorithms may include one or more adaptive, natural-language processing algorithms capable of parsing each of the classified portions of the profile content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of profile content (e.g., an address used in a real estate listing search) and a single classification parameter (e.g., a region of interest) and additionally, or alternatively, multiple classification parameters (e.g., a property tax level and a region of interest).

Based on the output of the one or more machine learning algorithms or processes, such as the one-dimensional, convolutional neural network model described herein, machine learning engine 38 may perform operations that classify each of the discrete elements of profile content as a corresponding one of the classification parameters, e.g., as obtained from classification data stored by the classification module 40.

The outputs of the machine learning algorithms or processes may then be used by the recommendation engine 36 to find one or more best matches for an advisor type. The matching and recommendation process may be performed as a many-to-one mapping between the user and multiple potential advisor types at the same time. In this way, the machine learning engine 38 can be leveraged to not only find the best matches between the user and each particular advisor type, but also to find affinities between the various advisor types to ensure an overall best match from a "team" perspective. For example, the recommendation engine 36 may recommend the second highest matched realtor for a user based on affinities between that realtor and highly-matched other advisor types such as a lawyer and property inspector. As discussed in greater detail below, the matching process implemented by the recommendation engine 36 may operate iteratively. For example, the recommendation engine 36 may conduct a many-to-one mapping of all available advisor types at each iteration and proceed to recommend, confirm, and engage one advisor type at a time. That is, as each advisor type is confirmed or "locked in" to the team, the recommendation engine 36 may reapply the many-to-one mapping for the remaining advisor types, since the highest matches in each advisor type could change at each iteration.

In another example embodiment, the recommendation engine 36 may provide the many-to-one mapping in a single iteration with alternatives for each advisor type provided such that if a highest match in a category is not confirmed, the alternatives can be contacted.

Referring again to FIG. 2, the access control module 44 may be used to apply a hierarchy of permission levels or otherwise apply predetermined criteria to determine what profile data can be shared with which entity in the computing environment 8. For example, the platform 10 may have been granted access to certain sensitive financial data 18 for a user, which is associated with a certain client device 12 in the computing environment 8. When communicating with the advisor systems 20, such access control measures can be applied to restrict the sharing of information with some advisor types. For example, the financial data 18 shared with a lawyer or realtor may be more extensive than that (if any) shared with a property inspector or moving company. Similarly, the client profile data 24 may include potentially sensitive information such as age, date of birth, or nationality. This potentially sensitive information may be required by a lawyer or realtor, but not necessarily to arrange a property inspection or to arrange moving services.

The platform 10 may also include a communications tool 46 that is provided to enable entities in the computing environment 8 to communicate with each other, e.g., via an instant messaging or chat interface. The platform 10 may also include a document sharing tool 48 to enable entities in the computing environment 8 to share documents and other files to assist with the acquisition process. For example, the user may upload and share example listings; a realtor may upload agreements, offers, or counter-offers; and a property inspector may share photos post-inspection, as well as an inspection report. The communications tool 46 and the document sharing tool 48 may include their own access control functionality or may utilize and coordinate with the access control module 44 for such functionality. It can be appreciated that the delineation between the access control module 44, communications tool 46, and document sharing tool 48 as shown in FIG. 2 is for illustrative purposes. The platform 10 may also include a user and machine interface module 50 to provide graphical user interfaces (GUIs), application programming interface (API) connectivity and interoperability, drivers, plug-ins, patches, and other software and/or hardware used to enable the entities in the computing environment 8 to communicate with each other via the platform 10. For example, the user and machine interface module 50 may utilize an API to coordinate access between it and an advisor type system 20. It can be appreciated that the user and machine interface module 50 may also provide a web browser-based interface, an application or "app" interface, a machine language interface, etc.

Figure 3:
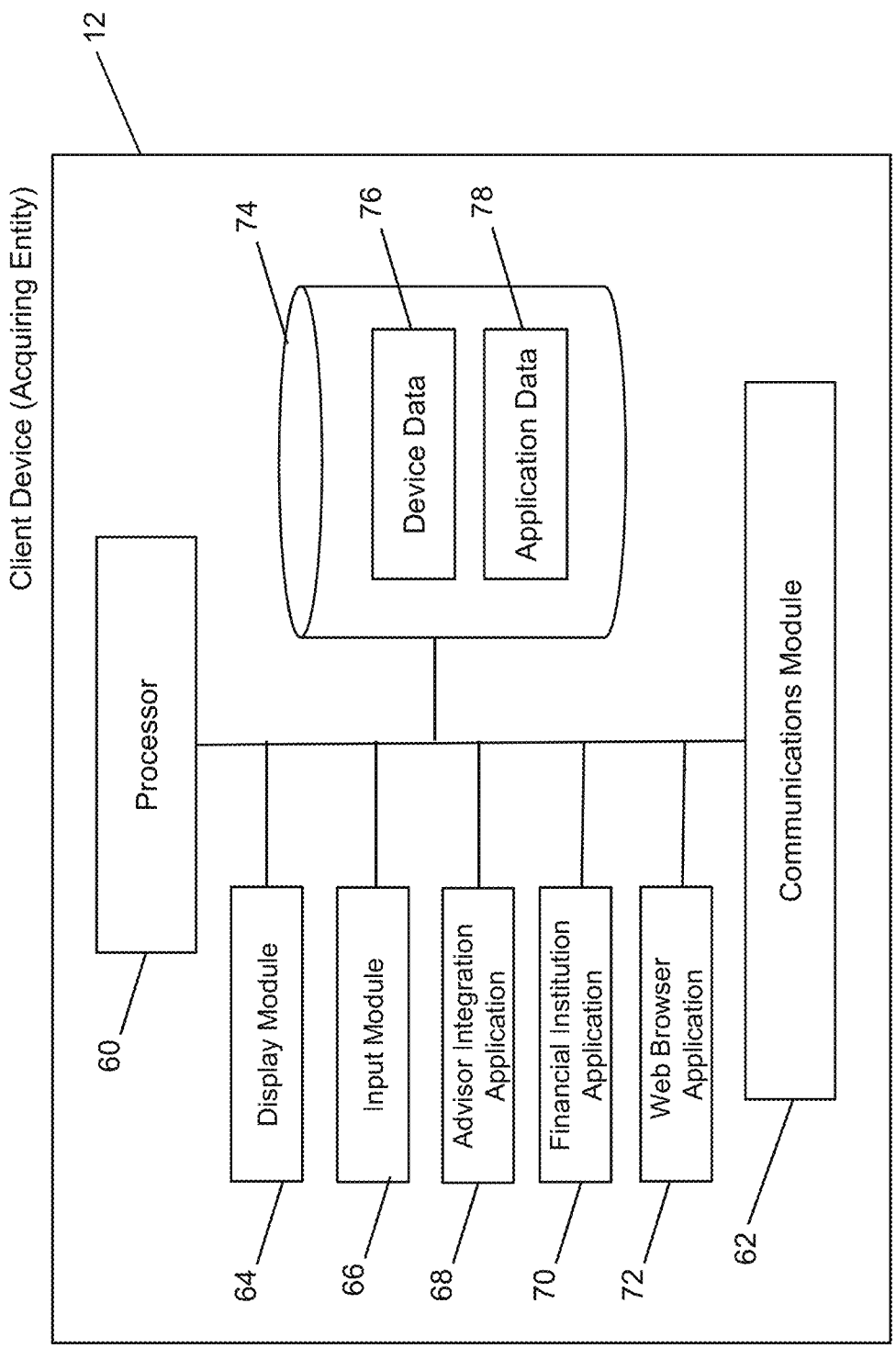
FIG. 3 is a block diagram of an example configuration of a client computing device associated with an acquiring entity.

In FIG. 3, an example configuration of the client device 12 is shown. In certain embodiments, the client device 12 may include one or more processors 60, a communications module 62, and a data store 74 storing device data 76 and application data 78. Communications module 62 enables the client device 12 to communicate with one or more other components of the computing environment 8, such as platform 10 or advisor systems 20 (or one of its components), via a bus or other communication network, such as the communication network 14. While not delineated in FIG. 3, the client device 12 includes at least one memory or memory device that can include a tangible and non-transitory computer-readable, medium having stored therein computer programs, sets of instructions, code, or data to be executed by processor 60. FIG. 3 illustrates examples of modules and applications stored in memory on the client device 12 and operated by the processor 60. It can be appreciated that any of the modules and applications shown in FIG. 3 may also be hosted externally and be available to the client device 12, e.g., via the communications module 62.

In the example embodiment shown in FIG. 3, the client device 12 includes a display module 64 for rendering GUIs and other visual output on a display device such as a display screen, and an input module 66 for processing user or other inputs received at the client device 12, e.g., via a touchscreen, input button, transceiver, microphone, keyboard, etc. The client device 12 may also include an advisor integration application 68, which may be a customized app provided by the platform 10 for use by the entities in the computing environment 8. Similarly, the client device 12 may include a financial institution application 70 provided by their financial institution system 16, e.g., for performing mobile banking operations. The client device 12 in this example embodiment also includes a web browser application 72 for accessing Internet-based content, e.g., via a mobile or traditional website. The data store 74 may be used to store device data 76, such as, but not limited to, an IP address or a MAC address that uniquely identifies client device 12 within environment 8. The data store 74 may also be used to store application data 78, such as, but not limited to, login credentials, user preferences, cryptographic data (e.g., cryptographic keys), etc.

It will be appreciated that only certain modules, applications, tools and engines are shown in FIGS. 2 and 3 for ease of illustration and various other components would be provided and utilized by the client device 12 and platform 10 as is known in the art. It will also be appreciated that the configuration of the advisor type systems 20 may be similar to that shown in FIG. 3, including the inclusion of an advisor integration application 68 and its functionality, discussed in greater detail below.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers in platform 10 or financial institution system 16, client device 12, or advisor type system 20, or accessible or connectable thereto. Any application or module herein described may be implemented using computer readable/executable instructions that may be stored or otherwise held by such computer readable media.

Figure 4:
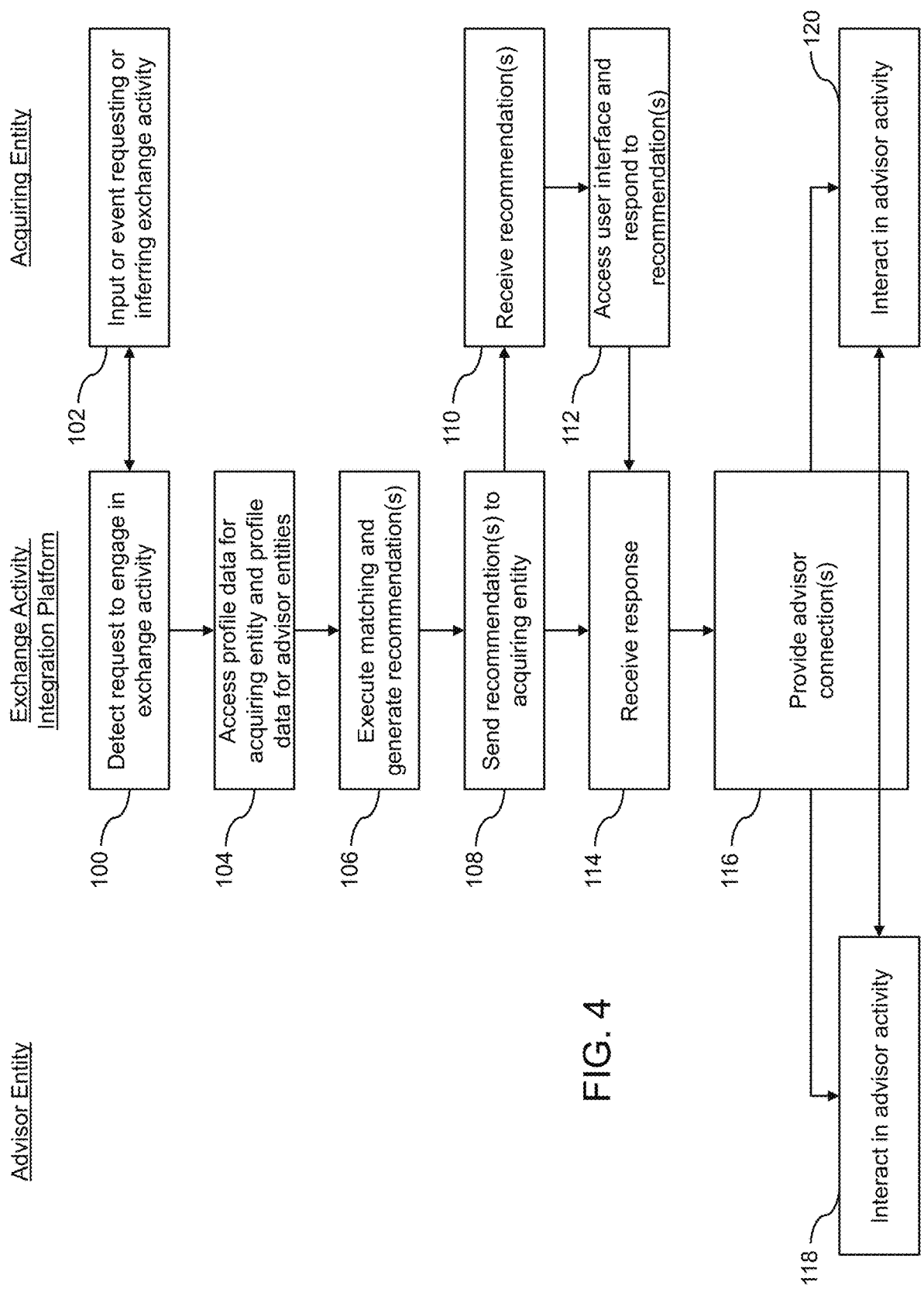
FIG. 4 is a flow diagram of an example of computer executable instructions for processing profile data to generate recommendations.

Referring to FIG. 4, an example embodiment of computer executable instructions for processing profile data to generate recommendations, and to provide advisor connections is shown. At block 100, the platform 10 detects a request to engage in exchange activity. The request can be provided by the user via the client device 12 or can be initiated by an input or event detected or inferred by an application or process. For example, a user may access a website provided by the platform 10, may download and install an app on their client device 12 via an app store, or may be directed to the platform 10 by clicking a link or redirection mechanism embedded in another application such as the financial institution application 70, an advertisement or other media content. An application or process can infer a request or intent to engage in the exchange activity by monitoring activity, such as searches, browsing, viewing, click-throughs, etc.

At block 102, an input or event that triggers such a request or infers an intent to engage in such exchange activities is detected by the platform 10 through one or more interactions between the platform 10 and the acquiring entity, in this example a user of a client device 12. The input or event that requests or infers the intent to engage in the exchange activity may be performed using an API or plug-in to a certain website, e.g., a property listing site, social media site, financial institution app or site, etc. In this way, the platform 10 can be configured to not only rely on active requests made by the acquiring entity, but also utilize channels and interfaces with the client device 12 to monitor and/or detect actions that allow the platform 10 to proactively engage with the users to drive traffic towards the platform 10.

At block 104, the platform 10 accesses the client profile data 24 associated with the acquiring entity, and the advisor type data 26. The advisor type data 26 accessed in block 104 can include all the advisor type data 26 for all advisor systems 20 of a certain type of advisor or the advisor type data 26 may be filtered based on a set of filtering criteria such as geographic area.

At block 106, the platform 10 uses the recommendation engine 36 and machine learning engine 38 to execute a matching process and generate one or more recommendations. At block 108, one or more of the generated recommendations is sent to the acquiring entity. The recommendations may be in the form of an electronic communication or alert or may be displayed actively within a browser or app currently being used by the client device 12 of the acquiring entity. At block 110 the one or more recommendations is received by the acquiring entity.

At block 112, the acquiring entity in this example accesses a user interface to respond to the recommendation(s). For example, if the request to engage in the exchange activity was initiated by the user within an app or browser interface, the response to the recommendation(s) may be performed directly within that app or browser interface. Alternatively, if the recommendation is sent proactively by the platform 10, e.g., according to a inferred intent to engage in the exchange activity (which may have been detected in a third party application or process), the user of the client device 12 may be required to access their advisor integration application 68 or web browser application 72 to respond to the recommendation(s). The response may include an acceptance or refusal of certain recommendations or can allow the user to tentatively select one or more advisors. For example, the platform 10 may send a first set of recommendations with a plurality of recommended advisors for each advisor type, with an option to accept, refuse or rank these recommended advisors for a second level matching.

At block 114, the platform 10 receives the response to the recommendation(s). It will be appreciated that blocks 106-114 may be performed in various sequences, including parallelly, serially, and iteratively. For example, blocks 106-114 may be performed once for each advisor type as advisor types are locked in for parts of the team being created by the user. For example, the platform 10 may have the acquiring entity connect and interface with a realtor first, as described in co-pending U.S. patent application Ser. No. [19006] filed on Feb. 13, 2019 and entitled "System and Method for Interfacing Acquiring Entities and Realtors", the contents of which are incorporated herein by reference.

Alternatively, blocks 106-114 may be performed only once as illustrated in FIG. 4, with the response by the user used by the platform 10 to automatically arrange the best possible set of matches to create the team for the user. Moreover, the platform 10 may regenerate proposed matches between the advisor entities and the acquiring entity and send revised recommendations prior to receiving a request to choose a match, based on at least one change to the advisor type data 26 (e.g., changed ratings or recommendations).

At block 116, in this example, the platform 10 has received at least one accepted recommendation and provides an advisor connection between the acquiring entity and an advisor entity. Such an advisor connection can include initiating a communication or chat using the communications tool 46 or updating dashboards within the advisor integration application 68.

At blocks 118 and 120, the advisor connection(s) may be used by the acquiring entity and advisor entity or entities, to interact with each other and participate in an advisor activity. For example, by creating an advisor connection at block 116 between a user and a realtor, viewings and offers can be facilitated via the platform 10, e.g., by exchanging communications, sharing documents, and building out further members of the homebuying team when the exchange activity is a home purchase.

Figure 5:
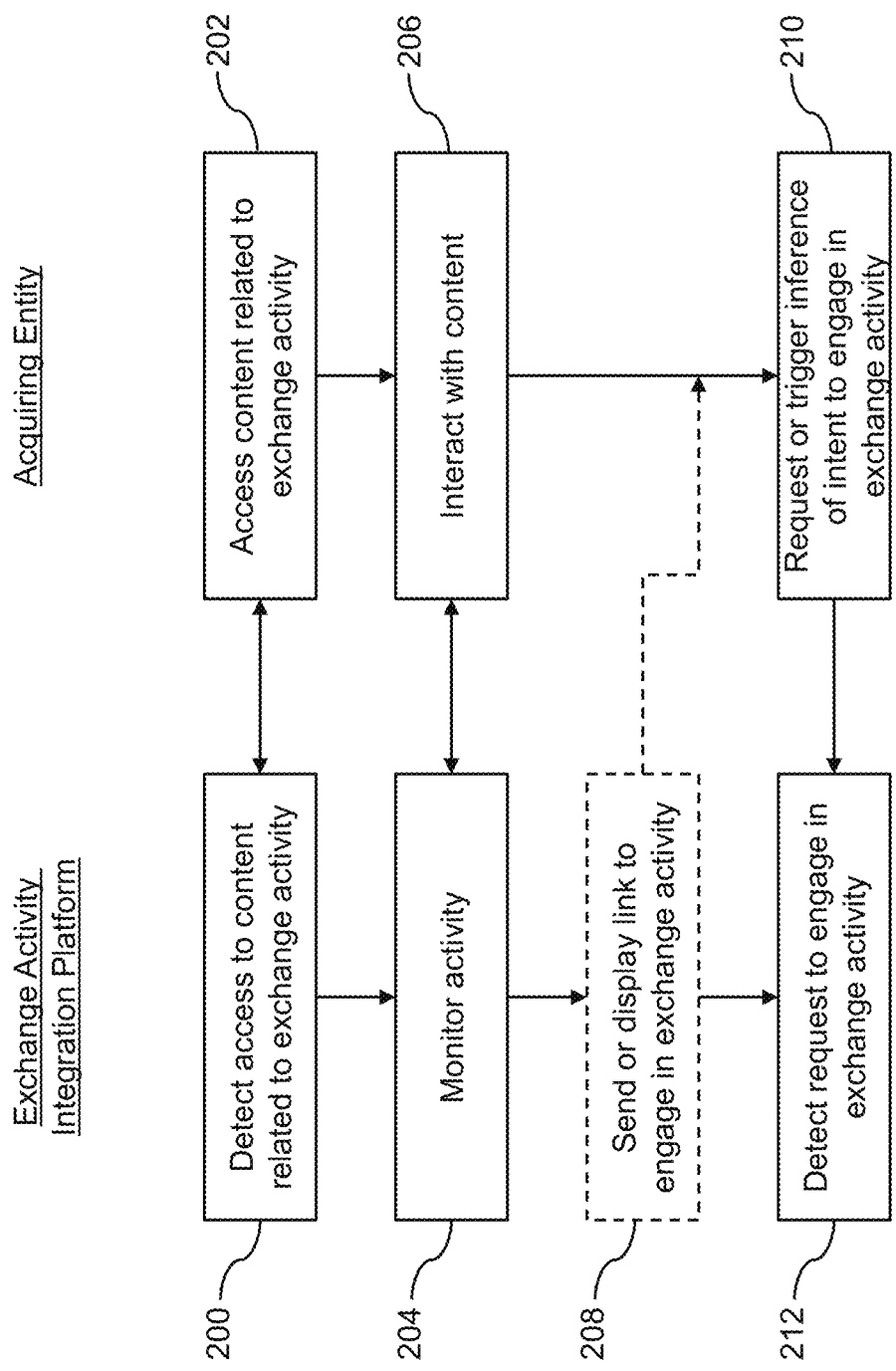
FIG. 5 is a flow diagram of an example of computer executable instructions for detecting a request to engage in a property exchange activity.

Referring to FIG. 5, an example embodiment of computer executable instructions for detecting a request to engage in exchange activity as illustrated generally by blocks 100 and 102 in FIG. 4 is shown. It will be appreciated that the process illustrated in FIG. 5 is only one example of how the platform 10 may initiate the process shown in FIG. 4.

At block 200, the platform 10 detects that the acquiring entity has accessed content related to the exchange activity. As shown in FIG. 5, the acquiring entity may access content related to the exchange activity at block 202, which is communicated to the platform 10. For example, the platform 10 may use an API or plug-in with a property listing site to infer the intention of a user to engage in a home buying process, since that user has been conducting detailed searches for real estate in their approximate geographic area. The platform 10 may use such a connection or interface to monitor this activity at block 204 such that the platform 10 can intelligently classify the acquiring entity search behaviour before triggering further action. In this example, the acquiring entity may interact with the content at block 206, and such interactions may occur in one or more sessions. That is, the interactions at block 206 and the monitoring at block 204 may occur at multiple different points in time before establishing an intent to engage in the exchange activity. For example, a user may casually search properties periodically as an interest or hobby, but when more serious about buying a home may begin engaging in more detailed searches, such as more realistic (and affordable) price ranges, more proximate to their current geographic location, etc.

Figure 9:
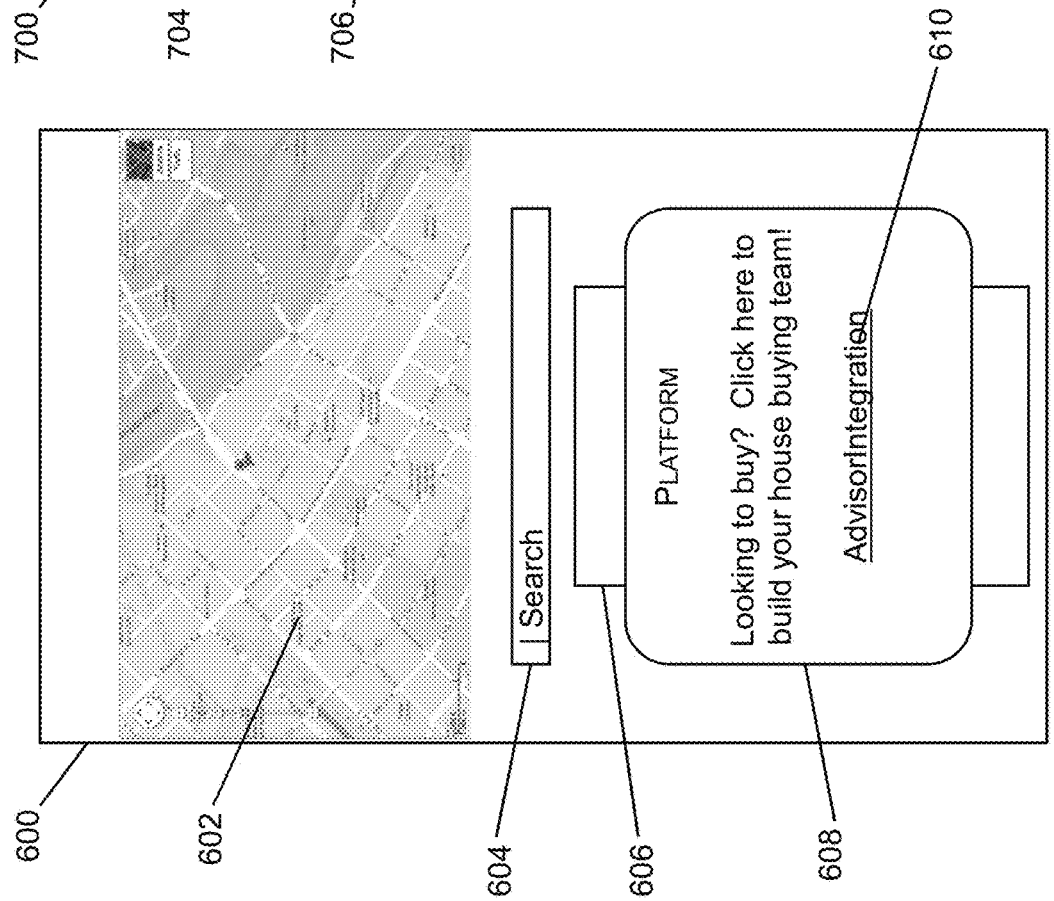
FIG. 9 is an example of a graphical user interface of a real estate listing search tool.

Optionally, at block 208, the platform 10 may actively send or display a link to the user to engage in the exchange activity. For example, as shown in FIG. 9, the platform 10 may be integrated with a property search site. In FIG. 9, a search GUI 600 is shown with a search entry box 604, a map output 602, and a search results list 606. By engaging in the search activities as illustrated in FIG. 9, the platform 10 through its embedded functionality may display a pop-up message 608 or prompt with a link 610 to access the platform 10. It can be appreciated that the message 608 can also be displayed by another entity such as the financial institution system 16 with the link directing the user to the platform 10. That is, the platform 10 can be a stand-alone entity, or can be integrated, affiliated or provided by another entity, such as an entity already known to the user (e.g., a financial institution). It will also be appreciated that in some example embodiments, access to the home searching websites may be used to monitor searching activities and conduct additional searches by the platform 10, e.g., as described in co-pending U.S. patent application Ser. No. [19007] filed on Feb. 13, 2019 and entitled "System and Method for Searching and Monitoring Assets Available for Acquisition", the contents of which are incorporated herein by reference.

Referring again to FIG. 5, the link to engage in the exchange activity may be used to trigger the request to engage in exchange activity at block 212. At block 210, the acquiring entity may either make a request (via a mechanism such as the link 610 shown in FIG. 9), or through their interactions at block 206 may infer their intent to engage in the exchange activities. That is, the platform 10 may or may not be required to actively solicit participation in generating advisor recommendations and thus the term "request" should be understood to include any active or passive information that when provided to the platform 10 can be considered a "request" to initiate the matching process.

Figure 6:
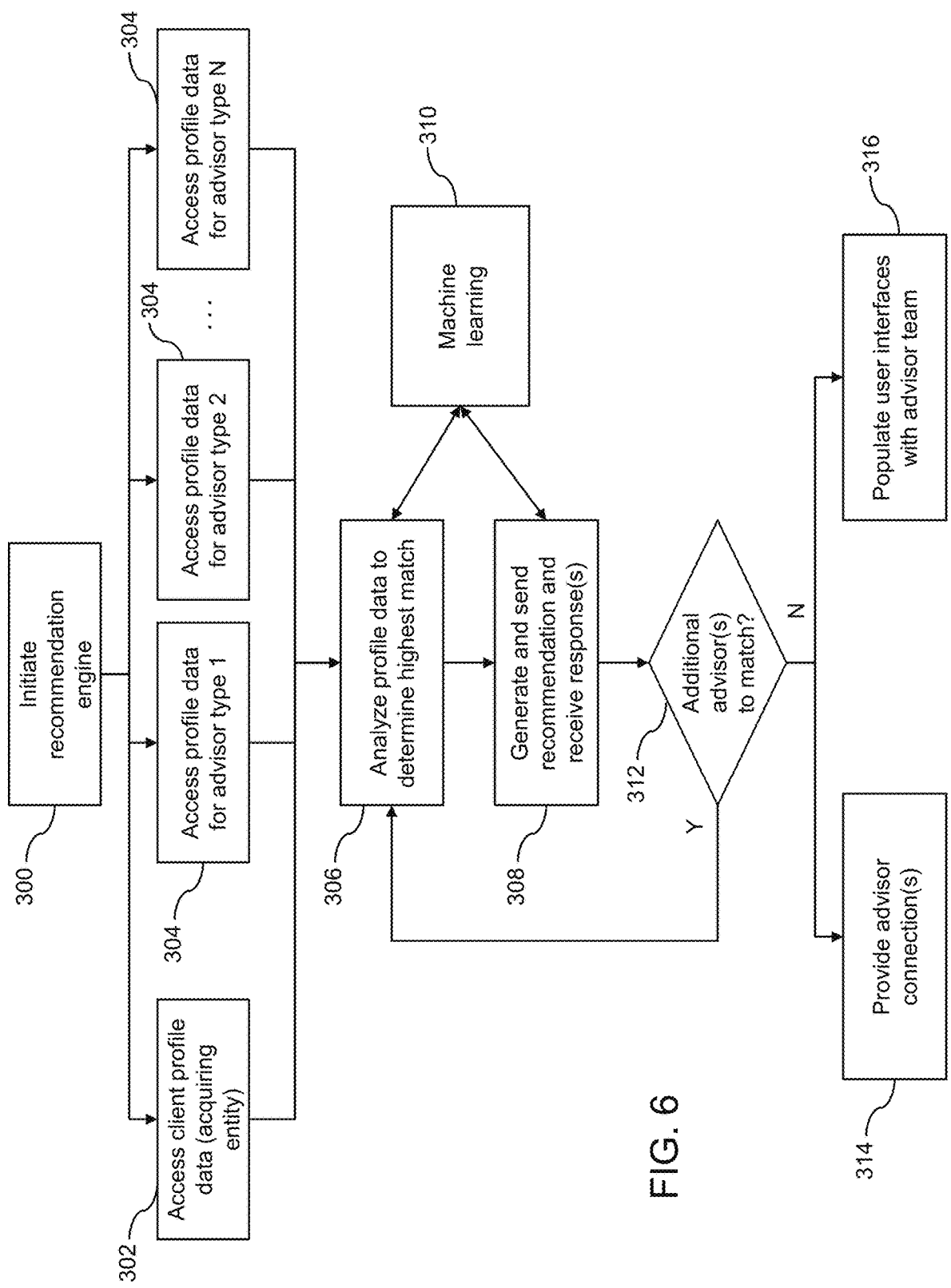
FIG. 6 is a flow diagram of an example of computer executable instructions for executing matching and recommendation processes.

Referring to FIG. 6, an example embodiment of computer executable instructions for executing matching and recommendation processes is shown. At block 300 the platform 10 initiates the recommendation engine 36 as herein described. At block 302, the recommendation engine 36 uses the databases interface module 34 to access the client profile data 24 associated with the acquiring entity or more generally the user as herein described.

At block 304, the recommendation engine 36 may also use the databases interface module 34 to access the advisor type data 26 for each advisor type that is to be analyzed for the matching process. The recommendation engine 36 uses the machine learning engine 38 to execute machine learning processes at block 310 as herein described. This may include analyzing the data accessed in blocks 302 and 304 to classify data such that relevant parameters can be identified and used to determine a highest match between the content in the client profile data 24 and the content in the advisor type data 26 at block 306. The matching process implemented at block 306 may be used to generate and send one or more recommendations and to receive one or more responses from the acquiring entity at block 308.

At block 308, various recommendation processes can be utilized. For example, each advisor can be matched one at a time. In another example embodiment, all advisors may be matched in a many-to-one mapping. Multiple advisors may also be ranked and listed in order to provide optional matches that can be selected by the user. As such, the process shown in FIG. 6 may determine at block 312 whether any additional advisors should be matched. If so, blocks 306 to 310 may be repeated in order to add other team members. If not, the platform 10 may provide one or more advisor connections at block 314 and populate one or more user interfaces with the advisor team at block 316. Block 316 may include populating dashboards through the advisor integration application 68, initiating communication interfaces such as chats using the communications tool 46, and creating repositories for sharing documents using the document sharing tool 48.

In addition to obtaining an acceptance to a recommendation by the acquiring entity, the platform 10 may also engage with the potential advisor entities to enable the potential advisor entities to accept or effectively "vet" the acquiring entity, or otherwise pre-empt an unsuitable or conflicted match. For example, successful realtors in a certain geographic area may inherently end up being highly matched with many potential homebuyers but not have suitable availability. Moreover, the platform 10 can benefit the advisors as well as the acquiring entities and therefore the advisors may be given an opportunity to be more selective in how the matching occurs, e.g., such that more popular advisors obtain the higher-value connections or to work with acquiring entities that have more realistic home buying goals.

Figure 7:
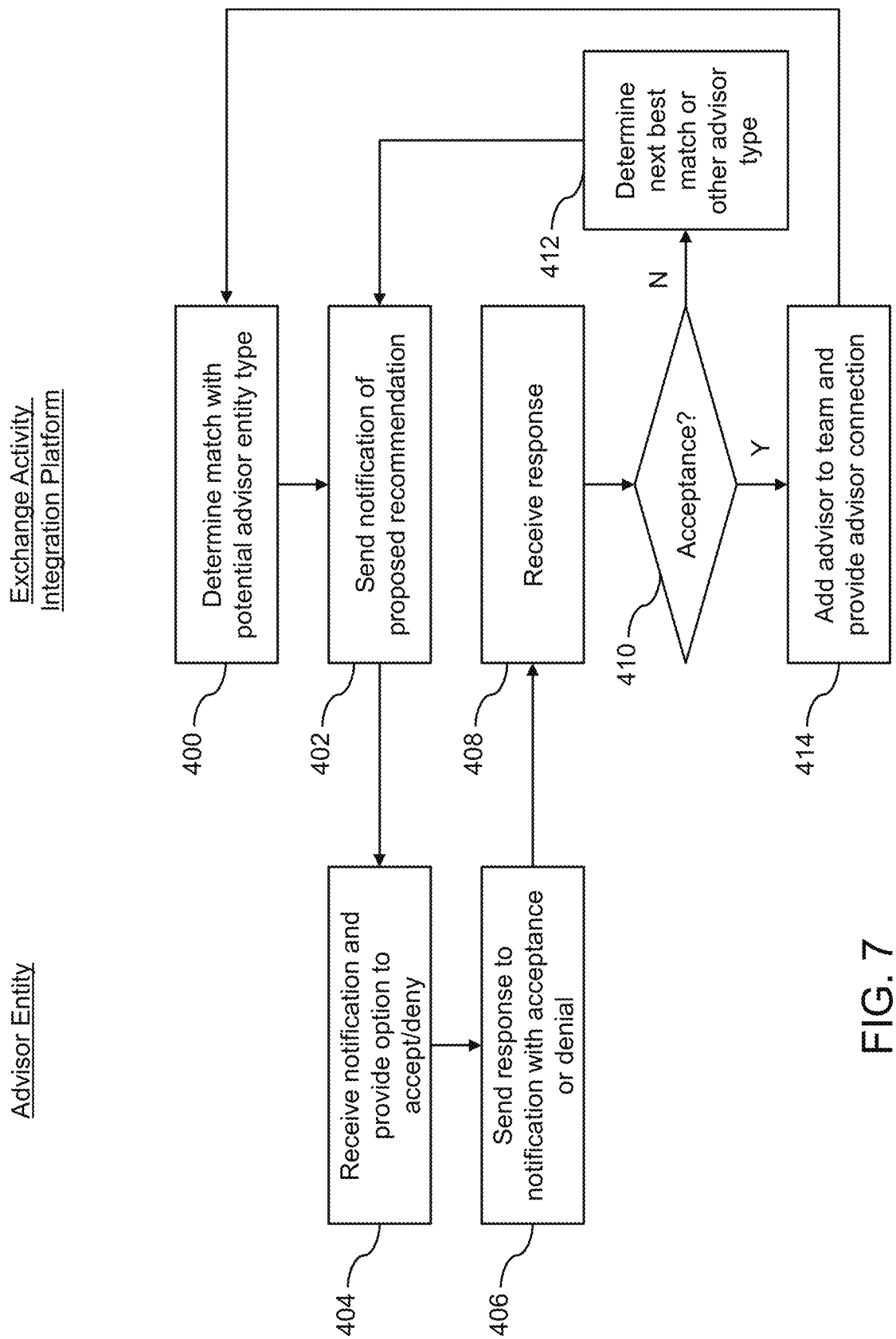
FIG. 7 is a flow diagram of an example of computer executable instructions for communicating proposed recommendations to advisor entities.

Referring to FIG. 7, an example embodiment of computer executable instructions for communicating proposed recommendations to advisor entities is shown. At block 400 the platform 10 determines a match with a potential advisor of an advisor entity type, e.g., as at block 306 in FIG. 6. The platform 10 determines that the proposed advisor entity is to accept or deny the recommendation. At block 402 the platform 10 sends a notification of the proposed recommendation to the associated advisor entity. The notification can be sent via the user and machine interface module 50 and the communications module 32 to an application such as the advisor integration application 68 or via another channel such as email, text message, chat, telephone, etc.

At block 404 the proposed advisory entity receives the notification via their advisor system 20, which may provide an option to accept or deny the proposed recommendation. At block 406 the advisor system 20 sends a response to the notification with an acceptance or denial. At block 408 the platform 10 receives the response from the advisor system 20 and determines at block 410 whether there was an acceptance. If not, at block 412 the platform 10 may determine a next best match or another advisor type to notify and repeat the process by returning to block 402. If there has been an acceptance, at block 414 the advisor is added to the team and provided with an advisor connection as at block 118 in FIG. 4. The process may then return to block 400 to determine a next match, e.g., for another advisor entity type. For example, after successfully matching the acquiring entity with a willing realtor in the process of FIG. 7, the platform 10 may execute the matching process again with the realtor being known and find the next best match for a next advisor entity such as a lawyer or mortgage broker. It will be appreciated that by using such an iterative approach, during the time that the platform 10 uses to build the team, current rating and feedback information regarding the advisor entities can continue to be collected such that the matching process can take into account the most up-to-date information and potentially revise certain matches or rankings within matched sets when applicable.

Figure 8:
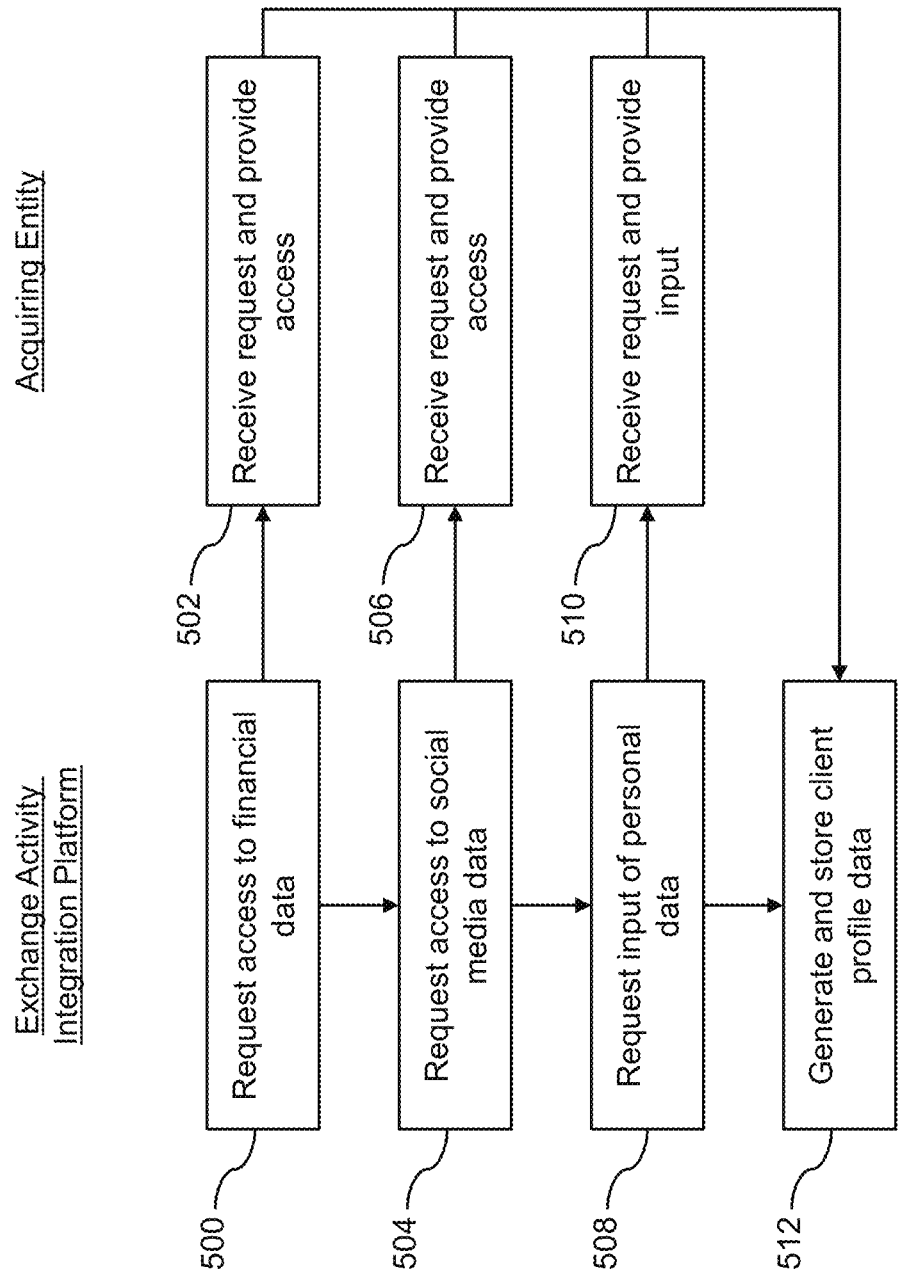
FIG. 8 is a flow diagram of an example of computer executable instructions for obtaining access to data for populating a client profile.

The platform 10 may obtain access to certain client profile data 24 that is associated with a user. Referring to FIG. 8, an example embodiment of computer executable instructions for obtaining access to data for populating a client profile is shown.

At block 500 the platform 10 requests access to financial data 18 and provides this request to the acquiring entity. At block 502 the acquiring entity receives the request for financial data 18 and provides access to the platform 10 in this example embodiment. It can be appreciated that the financial data 18 can be accessed directly when the platform 10 is associated with or provided directly by the financial institution system 16. The financial data 18 may also be entered by the acquiring entity when establishing a profile with the platform 10, e.g., via a questionnaire or other input mechanism. Full or partial access to the financial institution system 16 may also be provided to enable the client profile data 24 to have access to current and periodically changing financial data 18.

At block 504 the platform 10 requests access to social media data to obtain preferences and personality traits, searching and viewing histories, "likes", reposts, among other things, and provides this request to the acquiring entity. At block 506 the acquiring entity receives the request for social media data and provides access to the platform 10 in this example embodiment. Providing access in this example embodiment may include providing sign-in credentials or a permission to enable the platform 10 to directly access the social media data automatically and periodically. The permission may be an opt-in by the acquiring entity that the platform 10 can utilize publicly available social media data for that user. Access to private social media data can also be provided with the credentials.

At block 508 the platform 10 requests the input of certain personal data, to obtain other preferences and personality traits, or other data not available through social media, and provides this request to the acquiring entity. At block 510 the acquiring entity receives the request for the input of personal data and provides input to the platform 10 in this example embodiment. Providing input of personal information may include a questionnaire or survey or other input mechanism provided to the acquiring entity, e.g., via the advisor integration application 68.

At block 512 the platform 10 generates and stores the client profile data 24 for that acquiring entity via the databases interface module 34. The process shown in FIG. 8 may be initiated when registering a new user, be periodically performed to update and refresh the client profile data 24, or both.

Figure 10:
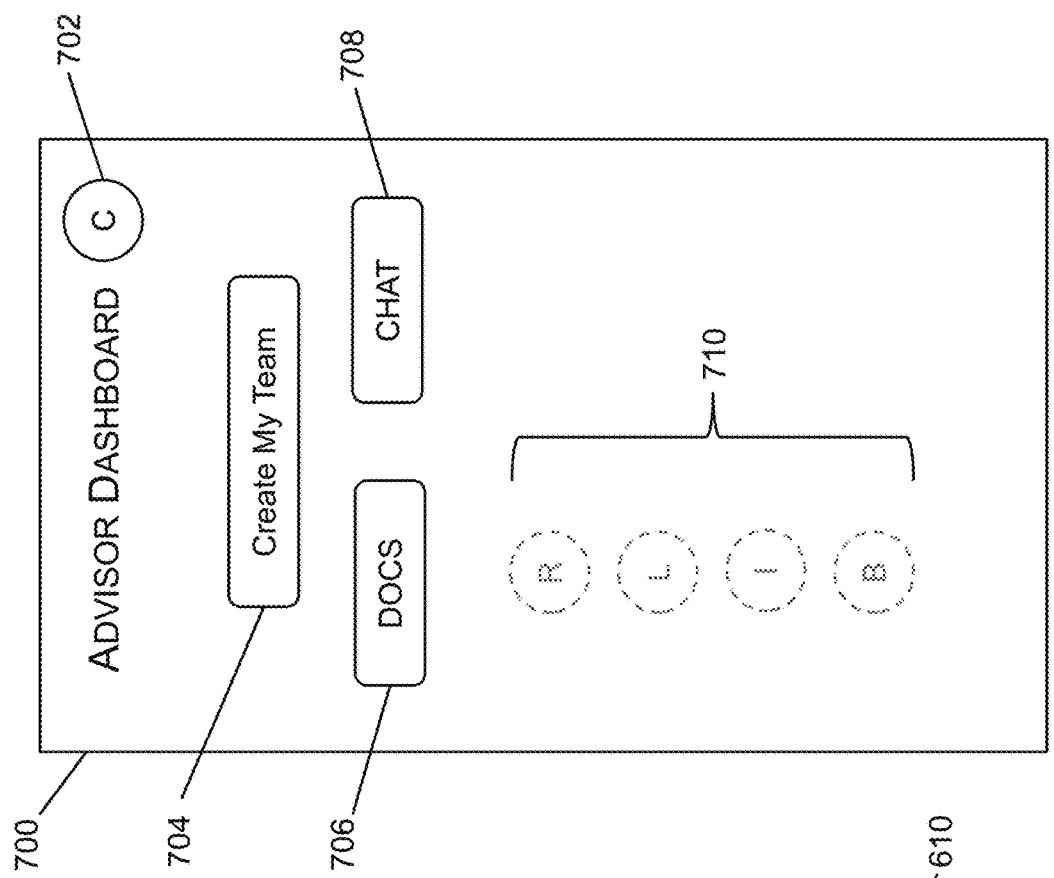
FIG. 10 is an example of a graphical user interface of an advisor dashboard.

Referring to FIG. 10, an example of a GUI of an advisor dashboard 700 is shown. The advisor dashboard 700 is associated with the client device 12 and its user, and in this example embodiment identifies the user with a user profile image 702 containing the letter "C". It will be appreciated that the user profile image 702 may be a character, avatar, photo, emoji, or other visual element. The dashboard 700 also includes a Create My Team option 704 to allow the user to initiate the matching process. The dashboard 700 may also include a DOCS option 706, which may be selected to access the document sharing tool 48, and a CHAT option 708, which may be selected to access the communications tool 46. A series of advisor profile images 710 may also be displayed, with each image 710 being populated (shown in dashed grey in FIG. 10 to illustrate a yet-to-be-added advisor type) as members are added to the team.

FIG. 11 is an example embodiment of a GUI of a virtual chat session 800 provided via the communications tool 46. The chat session 800 allows the team of advisors to collaboratively communicate with each other for participating in the transaction or other exchange being pursued by the acquiring entity. In this example embodiment, a first client message 802 is directed to the realtor indicating that: "@Realtor, I am ready to put in a bid". The chat session 800 may therefore be used by the user to communicate with their team and initiate an acquisition activity. A realtor message 804 is sent by the realtor that indicates: "Sounds good, adding Lawyer here". The lawyer may then be added to the chat session 800 and provides a lawyer message 806 indicating: "Hello, glad to help, just let me know when". In this way, the realtor provides notice to the lawyer of a potential transaction that will require their assistance.

In this example, two additional advisors contribute to the chat session 800. It will be appreciated that these advisors may be able to see the chat and voluntarily send their own messages as shown in FIG. 11 or may send a message in response to another message, similar to the realtor message 804. In this example, an inspector message 808 indicates: "I can be available next week for an inspection", and a mortgage broker message 810 indicates: "I will get the pre-approval now!". As such, the chat session 800 provides an efficient communications tool 46 and can avoid the need for the client to coordinate multiple lines of communication to arrange multiple contributions for the same exchange activity. In FIG. 11 a second client message 812 is also shown, which includes a link 814 to the document sharing tool 48. The chat session 800 may therefore also be used to navigate between tools and features within the platform 10.

FIG. 12 is an example of a document sharing GUI 900 of a document sharing tool 48. The document sharing tool 48 may be used by the acquiring entity and advisors to collaborate, share, edit, and exchange documents, and maintain a single repository for one or more exchange activities. In the example embodiment shown in FIG. 12, the client and advisor images 702, 710 may be used to identify who has access to the documents. It will be appreciated that the access control module 44 may also be used to control which entity can see what document. The document sharing GUI 900 may also include a list of documents 902 and descriptors 904 for each document 902, providing an ability to view and select individual files. The document sharing GUI 900 may also include an +ADD DOC option 906 that may be selected to upload a new document or file to the document sharing tool 48, and a CHAT option 908 to navigate between the document sharing GUI 900 and the chat session 800.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for interfacing entities engaged in property exchange activities, the device comprising:
a processor;
a communications module coupled to the processor; and
a memory coupled to the processor, the memory storing computer executable instructions that when executed by the processor cause the processor to:
establish connectivity with at least one external platform via an application programming interface;
receive via the communications module using the application programming interface, a first signal including data indicative of actions or activities by an acquiring entity automatically detected on a communication channel provided by the external platform and used by the acquiring entity, the communication channel and external platform being accessible to the server device via the application programming interface;
automatically determine from the data, an intent to engage in a property exchange activity by the acquiring entity, by:
monitoring the data to classify search behavior in a plurality of sessions; and
detecting that the acquiring entity has changed their search behavior between sessions indicating the intent to engage in the property exchange activity and triggering further action, wherein the changed search behavior comprises specifying a price range, specifying a geographic location, or both;
in response to determining the intent and triggering the further action:
access first profile data for the acquiring entity, the device having permission to access the first profile data;
access second profile data for each of a plurality of advisor entities related to the property exchange activity;
use the first profile data and the second profile data to generate at least one proposed match between a corresponding one or more of the plurality of advisor entities and the acquiring entity; and
send via the communications module to the acquiring entity a second signal including a recommendation, the recommendation comprising the at least one proposed match;
provide an acquiring entity user interface via the communications module to enable the acquiring entity to respond to the recommendation and communicate with advisor entities selected for the property exchange activity;
after receiving a first request to engage a first advisor entity of the plurality of advisor entities, provide a first advisor connection between the acquiring entity and the first advisor entity, the device enforcing at least one access control criterion on the first advisor connection to restrict sharing of at least some data of the first profile data according to activities required to be performed by the first advisor entity based on an advisor type; and
enable via the communications module at least one interaction in at least one advisor activity between the acquiring entity and the first advisor entity.

2. The device of claim 1, wherein the computer executable instructions further cause the processor to:
after receiving at least one second request to engage at least one corresponding second advisor entity of the plurality of advisor entities, provide at least one second advisor connection between the acquiring entity and the at least one second advisor entity, the device enforcing at least one access control criterion on the at least one second advisor connection to restrict sharing of at least some data of the first profile data according to activities required to be performed by the corresponding second advisor entity based on the advisor type; and enable via the communications module at least one interaction in at least one advisor activity between the acquiring entity and the at least one second advisor entity.

3. The device of claim 2, wherein the computer executable instructions further cause the processor to:

send via the communications module a third signal including a proposal for the first advisor entity based on a highest match, and await a fourth signal received via the communications module including the first request to engage the first advisor entity before determining others of the plurality of advisor entities;

use the first profile data and the second profile data to generate at least one secondary proposed match between the corresponding at least one second advisor entity and the acquiring entity, based at least in part on affinity between the first advisor entity and the at least one second advisor entity; and send via the communications module a fifth signal including at least one secondary recommendation for the at least one second advisor entity.

4. The device of claim 1, wherein subsequent to commencement of the property exchange activity, the computer executable instructions further cause the processor to:

use the first profile data and the second profile data to generate at least one proposed additional match between corresponding advisor entities and the acquiring entity; and send via the communications module a sixth signal including an additional recommendation to the acquiring entity, the additional recommendation comprising the at least one proposed additional match.

5. The device of claim 1, wherein the computer executable instructions further cause the processor to:

provide via the communications module a document sharing tool to the acquiring entity and the first advisor entity.

6. The device of claim 1, wherein the computer executable instructions further cause the processor to:

provide via the communications module a communication tool to the acquiring entity and the first advisor entity.

7. The device of claim 1, wherein the computer executable instructions further cause the processor to:

regenerate the at least one proposed match between the corresponding advisor entity and the acquiring entity and send via the communications module a seventh signal including a revised recommendation prior to receiving the first request, based on at least one change to the second profile data.

8. The device of claim 1, wherein the computer executable instructions further cause the processor to:

contact at least one potential advisor entity based on the at least one proposed match to obtain an acceptance to be included in the recommendation to the acquiring entity; and generate the recommendation based on receipt of the acceptance.

9. The device of claim 1, wherein the recommendation comprises at least one option between a plurality of advisor entities of a same type, and wherein the computer executable instructions further cause the processor to:

enable the acquiring entity to provide a selected option; and notify a selected advisor entity related to the selected option.

10. The device of claim 1, wherein the determined intent to engage in the property exchange activity further comprises a request detected by at least one of the communications module and the processor.

11. The device of claim 10, wherein the communications module determines the intent to engage in the property exchange activity using an existing interaction channel between the acquiring entity and a financial institution.

12. The device of claim 11, wherein the computer executable instructions further cause the processor to:

receive via the communications module an eighth signal including a notification from the acquiring entity or a financial institution associated with the acquiring entity, the notification comprising the intent to engage in the property exchange activity.

13. The device of claim 1, wherein the property exchange activity corresponds to a home purchase, and the plurality of advisor entities comprises at least one of a real estate agent or broker, a legal advisor, a mortgage advisor, a home inspector, an insurer, a moving company, and a storage company.

14. The device of claim 1, wherein the first profile data for the acquiring entity is not yet available to the device, and wherein the computer executable instructions further cause the processor to:

obtain the permission to access the first profile data; or receive via the communications module a ninth signal including the first profile data from the acquiring entity.

15. A method of interfacing entities engaged in property exchange activities, the method executed by a processor of a server device and comprising:

establishing connectivity with at least one external platform via an application programming interface;

receiving via a communications module using the application programming interface, a first signal including data indicative of actions or activities by an acquiring entity automatically detected on a communication channel provided by the external platform and used by the acquiring entity, the communication channel and external platform being accessible to the server device via the application programming interface;

automatically determining from the data, an intent to engage in a property exchange activity by the acquiring entity by:

monitoring the data to classify search behavior in a plurality of sessions; and detecting that the acquiring entity has changed their search behavior between sessions indicating the intent to engage in the property exchange activity and triggering further action, wherein the changed search behavior comprises specifying a price range, specifying a geographic location, or both;

in response to determining the intent and triggering the further action:

accessing first profile data for the acquiring entity, the device having permission to access the first profile data;

accessing second profile data for each of a plurality of advisor entities related to the property exchange activity;

using the first profile data and the second profile data to generate at least one proposed match between a corresponding one or more of the plurality of advisor entities and the acquiring entity; and sending via the communications module to the acquiring entity a second signal including a recommendation, the recommendation comprising the at least one proposed match;
providing an acquiring entity user interface via the communications module to enable the acquiring entity to respond to the recommendation and communicate with advisor entities selected for the property exchange activity;
after receiving a first request to engage a first advisor entity of the plurality of advisor entities, providing a first advisor connection between the acquiring entity and the first advisor entity, the device enforcing at least one access control criterion on the first advisor connection to restrict sharing of at least some data of the first profile data according to activities required to be performed by the first advisor entity based on an advisor type; and
enabling via the communications module at least one interaction in at least one advisor activity between the acquiring entity and the first advisor entity.

16. The method of claim 15, further comprising:
after receiving at least one second request to engage at least one corresponding second advisor entity of the plurality of advisor entities, providing at least one second advisor connection between the acquiring entity and the at least one second advisor entity, the device enforcing at least one access control criterion on the at least one second advisor connection to restrict sharing of at least some data of the first profile data according to activities required to be performed by the corresponding second advisor entity based on the advisor type; and
enabling via the communications module at least one interaction in at least one advisor activity between the acquiring entity and the at least one second advisor entity.

17. The method of claim 16, further comprising:
sending via the communications module a third signal including a proposal for the first advisor entity based on a highest match, and await a fourth signal received via the communications module including the first request to engage the first advisor entity before determining others of the plurality of advisor entities;
using the first profile data and the second profile data to generate at least one secondary proposed match between the corresponding at least one second advisor entity and the acquiring entity, based at least in part on affinity between the first advisor entity and the at least one second advisor entity; and
sending via the communications module a fifth signal including at least one secondary recommendation for the at least one second advisor entity.

18. The method of claim 15, wherein subsequent to commencement of the exchange activity, the method further comprises:
using the first profile data and the second profile data to generate at least one proposed additional match between corresponding advisor entities and the acquiring entity; and
sending via the communications module a sixth signal including an additional recommendation to the acquiring entity, the additional recommendation comprising the at least one proposed additional match.

19. The method of claim 15, further comprising:
regenerating the at least one proposed match between the corresponding advisor entity and the acquiring entity and sending via the communications module a seventh signal including a revised recommendation prior to receiving the first request, based on at least one change to the second profile data.

20. A non-transitory computer readable medium for interfacing entities engaged in property exchange activities, the computer readable medium comprising computer executable instructions for:
establishing connectivity with at least one external platform via an application programming interface;
receiving via a communications module using the application programming interface, a first signal including data indicative of actions or activities by an acquiring entity automatically detected on a communication channel provided by the external platform and used by the acquiring entity, the communication channel and external platform being accessible to a server device executing the computer executable instructions;
automatically determining from the data, an intent to engage in a property exchange activity by the acquiring entity by:
monitoring the data to classify search behavior in a plurality of sessions; and
detecting that the acquiring entity has changed their search behavior between sessions indicating the intent to engage in the property exchange activity and triggering further action, wherein the changed search behavior comprises specifying a price ramie, specifying a geographic location, or both;
in response to determining the intent and triggering the further action:
accessing first profile data for the acquiring entity, the device having permission to access the first profile data;
accessing second profile data for each of a plurality of advisor entities related to the property exchange activity;
using the first profile data and the second profile data to generate at least one proposed match between a corresponding one or more of the plurality of advisor entities and the acquiring entity; and
sending via the communications module to the acquiring entity a second signal including a recommendation, the recommendation comprising the at least one proposed match;
providing an acquiring entity user interface via the communications module to enable the acquiring entity to respond to the recommendation and communicate with advisor entities selected for the property exchange activity;
after receiving a first request to engage a first advisor entity of the plurality of advisor entities, providing a first advisor connection between the acquiring entity and the first advisor entity, the device enforcing at least one access control criterion on the first advisor connection to restrict sharing of at least some data of the first profile data according to activities required to be performed by the first advisor entity based on an advisor type; and
enabling via the communications module at least one interaction in at least one advisor activity between the acquiring entity and the first advisor entity.

* * * * *